(12) United States Patent
Craddock et al.

(10) Patent No.: US 9,547,613 B2
(45) Date of Patent: *Jan. 17, 2017

(54) DYNAMIC UNIVERSAL PORT MODE ASSIGNMENT

(71) Applicant: International Business Machines Corporation, Armonk, NY (US)

(72) Inventors: David F. Craddock, New Paltz, NY (US); Thomas A. Gregg, Highland, NY (US); Eric N. Lais, Tillson, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 32 days.

This patent is subject to a terminal disclaimer.

(21) Appl. No.: 14/501,582

(22) Filed: Sep. 30, 2014

(65) Prior Publication Data

US 2015/0261707 A1 Sep. 17, 2015

Related U.S. Application Data

(63) Continuation of application No. 14/211,274, filed on Mar. 14, 2014, now Pat. No. 9,384,158.

(51) Int. Cl.
*G06F 3/00* (2006.01)
*G06F 5/00* (2006.01)
(Continued)

(52) U.S. Cl.
CPC ......... *G06F 13/385* (2013.01); *G06F 13/4022* (2013.01)

(58) Field of Classification Search
CPC .................. G06F 13/385; G06F 13/4022
(Continued)

(56) References Cited

U.S. PATENT DOCUMENTS 5,761,448 A 6/1998 Adamson et al.
6,839,864 B2 1/2005 Mambakkam
(Continued)

OTHER PUBLICATIONS

U.S. Appl. No. 14/211,274, Non-Final Office Action, filed Mar. 14, 2014; Date Mailed: Sep. 11, 2015; 31 pages.

*Primary Examiner* — Farley Abad
*Assistant Examiner* — Henry Yu
(74) *Attorney, Agent, or Firm* — Cantor Colburn LLP; Steven Chui (57) ABSTRACT

Embodiments include a method and computer program product for dynamic universal port mode assignment for a general purpose computer system. A host bridge with a mixed mode request router routes requests received over a universal peripheral component interconnect express (PCIe) port from PCIe adapters utilizing different operating modes. An aspect includes a general purpose host computer with one or more PCIe universal ports allowing the computer to connect to a wide range of external peripheral devices, such as a local area networks, storage area networks, printers, scanners, graphics controllers, game systems, and so forth. PCIe is a modern universal port protocol for parallel ports that allows peripherals utilizing different operating modes to connect to a standard PCIe parallel port. The mixed mode request router supports converged PCIe adapters, which support multiple functions utilizing different PCIe modes converged onto the same mixed mode adapter.

11 Claims, 3 Drawing Sheets

(51) Int. Cl.
*G06F 13/00* (2006.01)
*H04K 1/10* (2006.01)
*H04W 4/00* (2009.01)
*H04J 3/24* (2006.01)
*G06F 13/38* (2006.01)
*G06F 13/40* (2006.01)

(58) Field of Classification Search
USPC ............ 710/9, 12, 316, 14, 16, 38; 719/318;
375/260; 370/329, 474
See application file for complete search history.

(56) References Cited

U.S. PATENT DOCUMENTS

| | | |
|---|---|---|
| 8,606,984 B2 | 12/2013 | Armstrong et al. |
| 8,615,645 B2 | 12/2013 | Craddock et al. |
| 8,621,112 B2 | 12/2013 | Coneski et al. |
| 9,106,546 B1 | 8/2015 | Naik |
| 2009/0144462 A1 | 6/2009 | Arndt et al. |
| 2009/0187694 A1* | 7/2009 | Baba .................. G06F 13/4022 710/316 |
| 2010/0228887 A1 | 9/2010 | Koike |
| 2010/0275205 A1 | 10/2010 | Nakajima |
| 2010/0309869 A1 | 12/2010 | Kim |
| 2011/0153906 A1 | 6/2011 | Suzuki et al. |
| 2012/0207231 A1* | 8/2012 | Zhang ................. H04L 27/2613 375/260 |
| 2013/0031568 A1* | 1/2013 | Tamir ...................... G06F 9/468 719/318 |
| 2013/0160002 A1 | 6/2013 | Graham et al. |
| 2013/0254453 A1 | 9/2013 | Sato et al. |

* cited by examiner

FIG. 3

DYNAMIC UNIVERSAL PORT MODE ASSIGNMENT

DOMESTIC PRIORITY

This application is a continuation of and claims priority from U.S. patent application Ser. No. 14/211,274, filed on Mar. 14, 2014, entitled "DYNAMIC UNIVERSAL PORT MODE ASSIGNMENT", the entire contents of which are incorporated herein by reference.

BACKGROUND

The present invention relates generally to computer systems, and more specifically, to dynamic universal port mode assignment for a general purpose computer system.

Universal interface ports are included on general purpose computers to allow the computers to connect to a wide range of external devices (also called peripheral devices), such as a local area networks, storage area networks, printers, scanners, graphics controllers, game systems, and so forth. Standards have been developed for the general purpose ports, usually referred to as the parallel and serial ports, allowing for the proliferation of different types of device adapters utilizing the standard port protocols to interface the external devices with a host computer system. These standards allow a wide range of different types of device adapters using different operating modes to connect to the computer over the same universal port. The modern computer must therefore be configured to properly identify and route messages arriving on the universal port from different types of device adapters using different operating modes.

SUMMARY

Embodiments include a method and computer program product for dynamic universal port mode assignment for a general purpose computer system. A host computer includes one or more universal ports for connecting external devices to the host computer, one or more operating systems, and one or more firmware device managers. A number of external device adapters supporting respective peripheral devices are each configured to operate in at least one mode. A universal device switch selectively connects the external device adapters to the universal port. A host bridge associated with the host computer includes a request router that receives requests from the external device adapters via the universal device switch, reads header data included with each request, and routes each request to one of the operating systems or to one or more of the firmware device managers based on the header data of the request. Requests from an external device adapter in a first mode are directed to one of the firmware device managers, while requests from an external device adapter in a second mode are directed to one of the operating systems. In addition, one or more of the external device adapters is a mixed mode adapter that selectively operates in more than one of the modes. A device table includes a device entry corresponding to each external device adapter or one of several PCI functions contained within the adapter. The device entry contains address translation and protection information or interruption mapping information for the PCI function, and the request router identifies each request with an associated device entry based in part on the mode of the requesting adapter. A mixed mode table includes a mixed mode entry corresponding to each mixed mode external device adapter, and the request router utilizes the mixed mode table to determine a mode of the mixed mode external device adapter with respect to each request received from a mixed mode adapter.

According to an aspect, the request router receives requests from a number of external device adapters. For each request, the request router reads header data included with the request to identify a corresponding device entry in a device table containing routing or processing instructions for a requesting adapter associated with the request. The portion of the header data used to identify the device entry depends on an operating mode of the requesting adapter. For the native mode, the request router looks up the corresponding device entry in the device table using the first data item of the request header. For the firmware managed mode, the request router looks up a corresponding device entry in the device table using a second data item of the request header. And for the mixed mode, the request router looks up an entry for the requesting adapter in a mixed mode table using a third data item of the request header indicating whether a current state of the mixed mode adapter is the native mode or the firmware managed mode. In addition, if the current state of the mixed mode adapter is the native mode, the request router looks up the corresponding device entry in the device table using the first data item of the request header. If, on the other hand, the current state of the mixed mode adapter is the firmware managed mode, the request router looks up the corresponding device entry in the device table using the second data item of the request header.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments include a host bridge for a general purpose computer with a mixed mode request router that routes requests received over a universal port from universal port adapters utilizing different operating modes. General purpose computers include universal ports to allow the computers to connect to a wide range of external peripheral devices, such as a local area networks, storage area networks, printers, scanners, graphics controllers, game systems, and so forth. Standards have been developed for the parallel and serial ports on general purpose computers allowing for the proliferation of different types of external devices utilizing standard port protocols. PCIe is a modern universal port protocol for serial ports that allows peripherals utilizing different operating modes to connect to a standard PCIe serial port. It will be appreciated that PCIe defines a serial communication protocol that can utilize multiple communication lines. A PCIe cable interface typically connects to the multi-pin connector traditionally referred to as the parallel port (or printer port) on a general purpose computer. While embodiments pertain to universal ports generally, specific embodiments utilizing the PCIe standard are described below as the illustrative embodiments.

The central processing unit (CPU) of the host computer may interact with a number of potential destinations for PCIe messages, such as different operating systems and firmware device managers resident on or interconnected with the host computer. The CPU may include an on-chip subsystem known as the host bridge that is responsible for routing PCIe messages received on the universal parallel port to correct destinations, such as various operating systems and device managers running on or interacting with the host computer. Due to the universal nature of the PCIe protocol, PCIe requests may arrive at the host bridge in a number of different modes, conventionally including a native mode and a firmware managed mode (FW mode), although additional modes could be envisioned. For the native mode, the host bus routes PCIe requests directly to an associated operating system, while for the FW mode, the host routes the PCIe requests to an associated firmware device manager, or to the operating system based on controls from the firmware device manager.

To route the PCIe requests to the correct destination, the host uses header data included in the PCIe request to look up a device entry corresponding to the requesting adapter in a device table (which was entered into the device table at configuration time), which contains routing and options for processing instructions for the PCIe request. This process is complicated by that fact that the host bridge uses different portions of the PCIe header to look up the device entry in the device table depending on the operating mode of the requesting adapter. In addition, certain converged network adapters (CNAs) referred to as mixed mode adapters are themselves configured to selectively operate in different modes. The modern host bridge must therefore be configured to properly identify and route PCIe messages arriving via a universal PCIe port from mixed mode as well as native mode and FW mode adapters.

Figure 1:
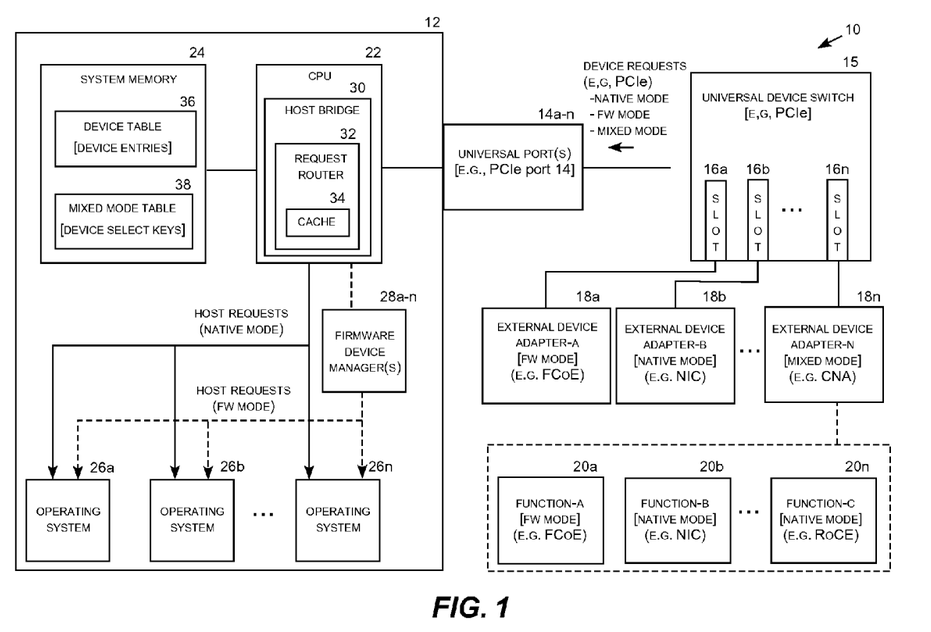
FIG. 1 depicts a computer system including a host bridge with a mixed mode universal port request router in accordance with an embodiment.

Turning now to FIG. 1, a computer system 10 including a host bridge 30 with a mixed mode universal port request router 32 is generally shown. The computer system 10 includes a host computer 12 with one or more universal ports 14*a*-*n*, such as PCIe ports. As each universal port may operate similarly, an individual representative universal port 14 will be discussed for descriptive convenience. The universal port 14 may be connected directly to a single-device adapter or, in the more challenging situation shown in FIG. 1, the port may be connected to the host computer 12 via a universal device switch 15, such as a PCIe switch, that includes a number of adapter slots 16*a*-*n* allowing a range of device adapters supporting a range of external or peripheral devices utilizing different operating modes to be selectively connected to the PCIe port.

To support this level of PCIe port flexibility, the host computer 12 includes a CPU 22 and a system memory 24 (e.g., one or more dynamic random access memory (DRAM) boards connected to the CPU via an internal system bus) that mediate PCIe messages between the PCIe port 14 and a range of destination devices, such as one or more operating systems 26*a*-26*n* and one or more firmware device managers 26*a*-26*n* (which are typically resident on the host computer 12 but may be interconnected with the host computer via any suitable networking capability).

The CPU 22 includes an on-chip host bridge 30, which in turn includes an on-chip request router 32. The request router includes a small on-chip cache memory 34 used to store recently and frequently retrieved table entries from a device table 36 and a mixed mode table 38 stored as software or firmware components in the system memory 24 (these caches could also be implemented separately). The device table 36 includes a device entry for each PCI function or PCIe adapter connected to the host computer 12 created when the respective device is registered for operation with the host computer, for example at the time of plug-and-play connection. Because certain PCIe adapters may be configured to operate in mixed modes, the device table 36 includes multiple device entries for each mixed mode PCIe adapter, which would typically comprise multiple PCI functions, where each device entry corresponds to a different operating mode (e.g., native mode and FW mode). The mixed mode table 38 therefore includes an entry (which may be as simple as a single bit indicating native mode or FW mode) for each mixed mode PCIe adapter that the system firmware sets and the request router reads to determine the operating mode of each PCIe request received from a mixed mode adapter. The request router 32 determines the current mode of the mixed mode adapter on a request-by-request basis by analyzing the content of the standard PCIe request header to determine which bit in the mixed mode table to read to make this determination, and then reads the indicated bit in the mixed mode table. This structure is instrumental in enabling the request router to be embodied as an on-chip subsystem utilizing hardware registers and firmware, while the frequently changing device table 36 and mixed mode table 38 are configured as firmware components stored in the system memory 24.

The request router 32 utilizes the device entries stored in the device table 36 to obtain instructions indicating where to route PCIe requests (and potentially additional processing to be applied to the requests). Each PCIe adapter connected to the host computer registers with the host bridge 30 during device configuration, which results in creation of a device entry in the device table 36 for each PCI function or PCIe adapter. This process has been complicated by the emergence of CNAs, which may be referred to as mixed mode adapters when they support a number of peripheral devices operating in different modes. The external device adapter 18*n* is an illustrative mixed mode adapter. To accommodate this variation, the request router 32 is configured to recognize a mixed mode as a potential operating mode of a requesting adapter. To do so, the request router 32 interacts with a mixed mode table 38 stored in the system memory 24, which includes mixed mode entries set by the system firmware, based on the mixed mode adapter configuration at registration time. The mixed mode table entries correspond to device select keys included in the PCIe message headers received from the mixed mode adapters in PCIe requests to inform the request router 32 of the current operating mode of the requesting PCI function of the mixed mode adapter 18*n*. For example, a first bit X in the mixed mode table 38 may be set to a "0" to indicate the native mode, while a second bit Y in the mixed mode table may be set to a "1" to indicate the FW mode. An individual PCIe request from the corresponding PCI function of the mixed mode adapter 18*n* informs the request router 32 to "read bit X" in the mixed mode table 38 when the PCIe function of the mixed mode adapter 18*n* is in the native mode, while it informs the request router 32 to "read bit Y" when PCI function of the mixed mode adapter is in the FW mode. Once the operating mode of the request has been determined, the request router 32 looks up the device entry for the mixed mode adapter in the device table 36 in the same manner that it looks up the device entries for other native mode and FW mode adapters.

As noted above, the host bridge 30 including its request router 32 may be realized through dedicated hardware and associated firmware as an on-chip subsystem of the CPU 22, whereas the device table and the mixed mode table may reside as firmware components stored in the system memory 24. This allows the tables to be easily modified to accommodate "on the fly" registration of different types of PCIe devices on a plug-and-play basis through device entries entered into the device table 36 and, for mixed mode adapters, and mixed mode entries entered into the mixed mode table 38. The request router 32 therefore includes a small allocation of on-chip cache memory 34 for storing a number of recently and frequently called entries from the mixed mode and device tables to increase the response speed of table read operations for recently or frequently accessed mixed mode and device table entries.

To provide a specific example, a first device adapter 18*a* operating in FW mode may be connected to a fiber channel over ethernet (FCoE) adapter; a second device adapter 18*b* operating in native mode may be connected to a network interface card (NIC) adapter; and a third device adapter 18*n* operating in a mixed mode may be connected to a converged network adapter (CNA). Although different standards may be supported, a PCIe embodiment will be described to provide a specific example. Thus, for the purpose of the continued description of this example, the representative universal port 14 is a PCIe port, the universal device switch 15 is a PCIe switch, the device adapters 18*a*-18*n* are PCIe adapters.

With respect to mixed mode operation, the CNA 18*n* supports a number of different functions utilizing different PCIe operating modes that can be selected by the CNA for communicating with the host computer 12. For example, the CNA 18*n* may include a first FCoE PCI function 20*a* operating in FW mode, a second NIC PCI function 20*b* operating in native mode, and a third remote direct memory access (RDMA) over converged ethernet (RoCE) PCI function 20*n* operating in native mode. It will be understood, of course, that these specific adapter connections are merely illustrative for the purpose of illustrating an example embodiment, and the purpose of the request router 32 is to allow a wide and previously unspecified range of peripheral devices to be connected to the host computer 12 "on the fly" through the PCIe switch. In addition, although bidirectional communication are enabled, PCIe requests directed from the PCIe adapters 18*a*-18*n* to the destination devices 26*a*-26*n* and 28*a*-28*n* will be described to illustrate the embodiments, and it will be understood that a similar addressing protocol may be defined to operate in the opposite communication direction to support duplex communications.

Figure 2:
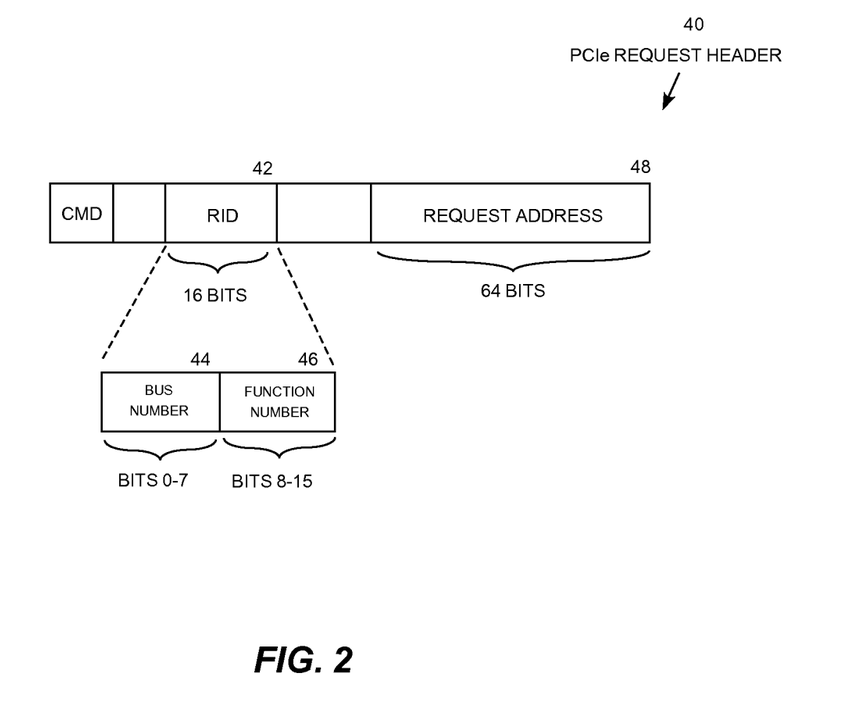
FIG. 2 depicts a standard request header format for universal port request received by the computer system over the universal port in accordance with an embodiment.

FIG. 2 depicts a particular embodiment of a standard request header format 40 for universal port request received by the host computer 12 over the PCIe port 14 via the PCIe switch 15. The PCIe request header 40 includes a number of standard fields including a request identifier (RID) field 42, which is a 16 bit field including an 8-bit bus number field 44 and an 8-bit function number field 46. For a native mode request, the request router 32 uses the value in the bus number and function number in fields 44 and 46 to look up the device entry for the requesting adapter in the device table 36, which informs the request router 32 of the correct destination operating system (OS) for the request. In this particular example, native mode PCIe requests may be directed to any of the operating systems 28*a*-28*n* as determined by the corresponding device entry for the particular request.

The entry in the bus number in field 44 also serves to locate a mode identifier indicating whether the requesting adapter is a native mode adapter, a firmware managed adapter (FW adapter), or a mixed-mode adapter. The mode identifier is a register in the host bridge, that is indexed by the bus number to locate a 2-bit mode identifier, that in turn indicates whether the adapter is a native mode, firmware managed mode or mixed mode adapter. The RID header 40 also includes a 64-bit request address field 48. For a FW mode adapter, the request router 32 uses a portion of the value in a 64-bit request address field 48 in the header (e.g., the high order 8 or 16 bits) to look up the correct device entry in the device table 36.

For a mixed mode requesting adapter, specific requests may be sent in the native mode or in the FW mode, depending on the type of function active on the mixed mode requesting adapter. The bus number in field 44 may therefore indicate that a PCIe request has been received from a mixed mode adapter. In this case, the request router 32 uses the value in the function number in field 46 to locate an entry (e.g., bit) in the mixed mode table 38 indicating whether the requesting mixed mode adapter is in the native mode or in the FW mode with respect to the specific request. For example, the PCI function number may instruct the request router 32 to read a particular bit "X" in the mixed mode table that the system firmware set to a "0" at registration time to indicate that the PCIe request is a native mode request. Alternatively, the PCI function number may instruct the request router 32 to read a different bit "Y" in the mixed mode table that the system firmware set to a "1" at registration time to indicate that the PCIe request is a FW mode request. Once the request router 32 has determined the current mode of the mixed mode adapter 18*n*, the request router 32 has the information it needs to look up the correct device entry in the device table 36 using the bus number and function number in fields 44 and 46 if the mixed-mode adapter is in the native mode, and using a portion of the request address in field 48 if the mixed-mode adapter is in the FW mode.

Figure 3:
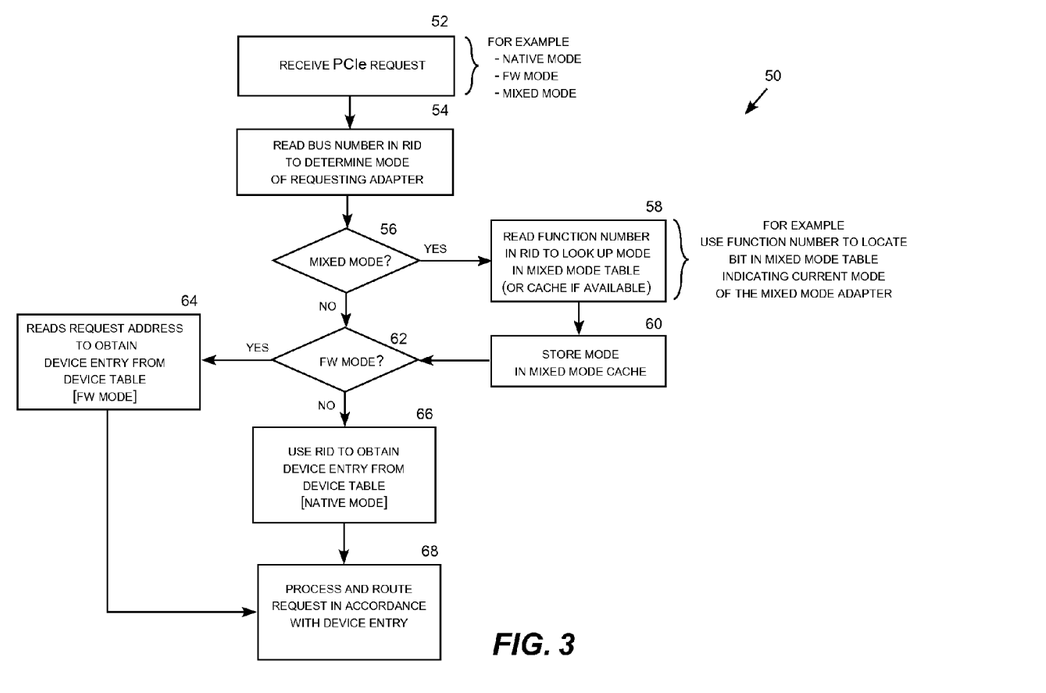
FIG. 3 depicts a process flow for operating a mixed mode universal port request router in accordance with an embodiment.

FIG. 3 depicts a process flow 50 for operating the host bridge 30 with a mixed mode universal port request router 32.

In block 32, the request router 32 receives a PCIe request, which may be received from a FW mode PCIe adapter (such as the FW mode adapter 18*a* shown in FIG. 1), a native mode PCIe adapter (such as the native mode adapter 18*b* shown in FIG. 1), or a mixed mode PCIe adapter (such as the mixed mode adapter 18*n* shown in FIG. 1). In block 54, the request router 32 reads the header data, in this example the request header 40 shown in FIG. 2, to obtain the bus number in the bus number field 44 to determine the mode of the requesting PCIe adapter. In block 56, the request router 32 determines whether the requesting adapter is a mixed mode adapter. If the requesting adapter is a mixed mode adapter, the "YES" branch is followed to block 58, in which the request router 32 reads the function number in the function number field 46 of the request header, which the request router uses to look up the mode of the request in the mixed mode table 36 (or the local cache memory 34 if the entry is available in cache). In block 60, the request router 32 stores the mixed mode entry for the requesting device from the mixed mode table 38 in the cache memory 34 (if it is not already stored in cache).

Block 60 and the "NO" branch from block 56 are followed by block 62, in which the request router 32 determines whether the requesting adapter is a FW mode adapter. If the requesting adapter is a FW mode adapter, the "YES" branch is followed to block 64, in which the request router 32 reads a portion of the request address in the request address field 48 to determine the device entry corresponding to the requesting adapter and then locates the correct device entry for the request in the device table 36. If the requesting adapter is a not a FW mode adapter (which by process of elimination means that it is a native mode adapter), the "NO" branch is followed to block 66, in which the request router 32 used the bus number and function number in the fields 44 and 46 of the RID to determine the device entry corresponding to the requesting PCI function of the adapter and then locates the correct device entry for the request in the device table 36. Blocks 64 and 66 are followed by block 68, in which the request router 32 routes (and optionally processes) the request in accordance with the device entry. For example, native mode requests are routed to the correct destination operating system as indicated by the device entry, while FW mode requests are routed to the correct destination firmware device manager or operating system based on PCI address controls set by the firmware device manager as indicated by the device entry.

Technical effects and benefits include efficient and accurate integration of mixed mode PCIe adapters into the PCIe host bridge infrastructure. The host bridge including its request router may be realized through dedicated hardware and associated firmware as a subsystem of the CPU, whereas the device table and the mixed mode table may reside in system memory where they can be easily modified to accommodate "on the fly" registration of different types of PCIe devices to the computer system on a plug-and-play basis. The request router therefore includes a cache memory for storing a number of recently and frequently called entries from the mixed mode and device tables to increase the response speed of table read operations for recently or frequently accessed entries.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implemented as implemented aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for implementing a request router for a universal port, the method comprising:

receiving a plurality of requests from a plurality of external device adapters, each external device adapter configured to operate in at least one mode;

for each request, with a computer processor, reading header data included with the request to identify a corresponding device entry in a device table containing routing instructions for a requesting adapter associated with the request, wherein the portion of the header data used to identify the corresponding device entry depends on an operating mode of the requesting adapter;

if a first data item in the request header of a received request indicates that the requesting adapter associated with the received request is a native mode adapter, looking up the corresponding device entry in the device table using the first data item of the request header;

if the first data item in the request header of the received request indicates that the requesting adapter associated with the received request is a firmware managed mode adapter, looking up the corresponding device entry in the device table using a second data item of the request header;

if the first data item in the request header of the received request indicates that the requesting adapter associated with the received request is a mixed mode adapter, looking up a mode entry for the requesting adapter in a mixed mode table using a third data item of the request header indicating whether a current state of the mixed mode adapter is the native mode or the firmware managed mode;

if the current state of the mixed mode adapter is the native mode, looking up the corresponding device entry in the device table using the first data item of the request header;

if the current state of the mixed mode adapter is the firmware managed mode, looking up the corresponding device entry in the device table using the second data item of the request header;

wherein the first data item of the header data of each request of the plurality of requests is used to identify a mode of a respective requesting adapter associated with the request, the first data item of the header data is used to identify the corresponding device entry in the device table for the respective requesting adapter having the native mode, and the second data item data is used to identify the corresponding device entry in the device table for the respective requesting adapter having the firmware managed mode, the first data item differing from the second data item; and routing each request of the plurality of requests based on the corresponding device entry in the device table.

2. The method of claim 1, wherein the received request is received from a mixed mode adapter, and further comprising routing the received request from the mixed mode adapter when the mixed mode table indicates that the mixed mode adapter is in the firmware managed mode to a firmware device manager or an operating system under control of the firmware device manager as determined by the corresponding device entry obtained from the device table.

3. The method of claim 2, further comprising routing the received request from the mixed mode adapter when the mixed mode table indicates that the mixed mode adapter is in the native mode to an operating system as determined by the corresponding device entry obtained from the device table.

4. The method of claim 1, wherein the header data of the received request comprises a request identifier (RID) field that includes a bus number field indicating a function number and whether the requesting adapter is a firmware managed adapter, a native mode adapter, or a mixed mode adapter.

5. The method of claim 4, further comprising using the bus number and the function number to look up a device entry for the received request in the device table when the requesting adapter is in the native mode.

6. The method of claim 5, further comprising using the bus number to determine that the requesting adapter is in the firmware managed mode and using a request address included in the header data to look up the corresponding device entry for the received request in the device table when the requesting adapter is in the firmware managed mode.

7. The method of claim 6, wherein using the bus number to determine that the requesting adapter is a mixed mode adapter comprises using a function number included in the header data to look up the mixed mode entry for the received request in the mixed mode table indicating whether the current mode of the mixed mode adapter is the native mode or the firmware managed mode;

if the current mode of the mixed mode adapter is the native mode, using the bus number and function number to look up the corresponding device entry for the received request in the device table; and if the current mode of the mixed mode adapter is the firmware managed mode, using the request address included in the header date to look up the corresponding device entry for the received request in the device table.

8. A computer program product for implementing a request router for a universal port, the computer program product comprising a computer readable storage medium having program instructions embodied therewith, the program instructions readable by a processing circuit to cause the processing circuit to perform a method comprising:

receiving, at a host computer, a plurality of requests from a plurality of external device adapters, each external device adapter configured to operate in at least one mode, the host computer comprising one or more operating systems and one or more firmware device managers;

reading header data included with each request of the plurality of requests;

for each request of the plurality of requests, identifying a corresponding device entry in a device table containing routing instructions for a requesting adapter associated with the request, wherein the portion of the header data used to identify the corresponding device entry depends on an operating mode of the requesting adapter;

if a first data item in the header data of a received request indicates that the requesting adapter associated with the received request is a native mode adapter, looking up the corresponding device entry in the device table using a second data item of the header data;

if the first data item in the header data of the received request indicates that the requesting adapter associated with the received request is a firmware managed mode adapter, looking up the corresponding device entry in the device table using a third data item of the header data;

if the first data item in the header data of the received request indicates that the requesting adapter associated with the received request is a mixed mode adapter, looking up a mixed mode entry for the requesting adapter in a mixed mode table to determine a current state of the mixed mode adapter is as the native mode or the firmware managed mode, wherein one or more of the external device adapters is the mixed mode adapter configured to selectively operate in more than a single mode;

if the current state of the mixed mode adapter is the native mode, looking up the corresponding device entry in the device table using the first data item of the header data;

if the current state of the mixed mode adapter is the firmware managed mode, looking up the corresponding device entry in the device table using the second data item of the header data;

wherein the first data item of the header data of each request of the plurality of requests identifies a mode of a respective requesting adapter associated with the request, the second data item of the header data identifies the corresponding device entry in the device table for the respective requesting adapter having the native mode, and the third data item data identifies the corresponding device entry in the device table for the respective requesting adapter having the firmware managed mode, the second data item differing from the third data item; and routing each request of the plurality of requests to at least one of an operating system, of the one or more operating systems, and a firmware device manager, of the one or more firmware device managers, based on the header data in the request, wherein each request is routed based on the corresponding device entry in the device table.

9. The computer program product of claim 8, wherein the received request is received from a mixed mode adapter, and further comprising:

routing the received request from the mixed mode adapter when the mixed mode table indicates that the mixed mode adapter is in the firmware managed mode to a firmware device manager as determined by the corresponding device entry obtained from the device table; and routing the received request from the mixed mode adapter when the mixed mode table indicates that the mixed mode adapter is in the native mode to an operating system as determined by the corresponding device entry obtained from the device table.

10. The computer program product of claim 8, wherein the header data of the received request comprises a request identifier (RID) field that includes a bus number field indicating a function number and whether the requesting adapter is a firmware managed adapter, a native mode adapter, or a mixed mode adapter, further comprising:

using the bus number and the function number to look up the corresponding device entry for the received request in the device table when the requesting adapter is in the native mode;

using the bus number to determine that the requesting adapter is in the firmware managed mode and using a request address included in the header data to look up the corresponding device entry for the received request in the device table when the requesting adapter is in the firmware managed mode.

11. The computer program product of claim 10, wherein using the bus number to determine that the requesting adapter is mixed mode adapter comprises a function number included in the header to look up the mixed mode entry for the received request in the mixed mode table indicating whether the current mode of the mixed mode adapter the native mode or the firmware managed mode;

if the current mode of the mixed mode adapter is the native mode, using the bus number and the function number to look up the corresponding device entry for the received request in the device table; and if the current mode of the mixed mode adapter is the firmware managed mode, using the request address included in the header data to look up the corresponding device entry for the received request in the device table.

\* \* \* \* \*